(12) United States Patent
Sato et al.

(10) Patent No.: US 7,660,050 B2
(45) Date of Patent: Feb. 9, 2010

(54) IMAGING LENS, CAMERA MODULE, AND PORTABLE TERMINAL APPARATUS

(75) Inventors: Kenichi Sato, Saitama (JP); Minoru Taniyama, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 78 days.

(21) Appl. No.: 12/032,483

(22) Filed: Feb. 15, 2008

(65) Prior Publication Data
US 2008/0239510 A1    Oct. 2, 2008

(30) Foreign Application Priority Data
Mar. 27, 2007    (JP)    ............... P2007-081195

(51) Int. Cl.
*G02B 9/14*    (2006.01)
*G02B 13/18*    (2006.01)
(52) U.S. Cl. ...................... 359/785; 359/716
(58) Field of Classification Search ........... 359/716, 359/785
See application file for complete search history.

(56) References Cited

U.S. PATENT DOCUMENTS 6,961,191 B2    11/2005    Sato et al.

2005/0275950 A1 *    12/2005    Kubota et al. ............... 359/689

FOREIGN PATENT DOCUMENTS

| JP | 2004-302058 A | 10/2004 |
|---|---|---|
| JP | 2005-173319 A | 6/2005 |
| JP | 2005-227755 A | 8/2005 |
| JP | 2005-292235 A | 10/2005 |

* cited by examiner

*Primary Examiner*—William C Choi
(74) *Attorney, Agent, or Firm*—Birch, Stewart, Kolasch & Birch, LLP.

(57) ABSTRACT

An imaging lens comprises, in order from an object side: a first lens having a positive refractive power and a meniscus shape and having a convex surface directed to the object side; a second lens having a negative refractive power in the vicinity of an optical axis of the imaging lens; and a third lens having a positive refractive power in the vicinity of the optical axis, wherein at least one surface of each of the second lens and the third lens is an aspheric surface; and the imaging lens satisfies the following conditional expression expressions: $0.7 < |f1/f| < 0.8$ ... (1) $0.3 < |f2/f| < 0.8$ ... (2) $7.5 < vd_1 < 96$ ... (3) $TL/2Y < 0.9$ ... (4) where f: focal length of the imaging lens; f1: focal length of the first lens; f2: focal length of the second lens; $vd_1$: Abbe number of the first lens for the d-line; TL: length between the object-side surface of the first lens to an image forming position of the imaging lens; and Y: maximum image height.

9 Claims, 22 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

| EXAMPLE 1: LENS DATA ||||| 
|---|---|---|---|---|
| Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| 1 (APERTURE STOP) | — | −0.25 | | |
| 2 | 1.198 | 0.70 | 1.439 | 94.9 |
| 3 | 5.164 | 1.14 | | |
| 4 | −1.041 | 0.66 | 1.604 | 27.2 |
| 5 | −4.065 | 0.10 | | |
| 6 | 1.144 | 1.00 | 1.531 | 55.5 |
| 7 | 1.728 | 0.70 | | |
| 8 | ∞ | 0.30 | 1.516 | 64.1 |
| 9 | ∞ | 0.32 | | |

(f=4.52, FNo.=2.8)

FIG. 9

| EXAMPLE 1: ASPHERIC SURFACE DATA | | | |
|---|---|---|---|
| ASPHERIC SURFACE COEFFICIENT | SURFACE NUMBER | | |
| | SECOND SURFACE | THIRD SURFACE | FOURTH SURFACE |
| K | 0.000E+00 | 0.000E+00 | 0.000E+00 |
| A3 | -9.690E-03 | -7.880E-03 | -3.197E-02 |
| A4 | 1.030E-01 | 1.146E-01 | 1.447E-01 |
| A5 | 7.983E-02 | -3.456E-01 | -7.816E-01 |
| A6 | -7.335E-01 | 6.726E-01 | 9.391E-01 |
| A7 | 1.865E+00 | -2.819E-01 | -6.177E-01 |
| A8 | -1.268E+00 | -5.323E-01 | -1.099E+00 |
| A9 | -1.372E+00 | 2.265E-01 | 6.809E-01 |
| A10 | 9.619E-01 | 6.441E-01 | 1.506E+00 |
| A11 | 1.902E+00 | 4.065E-02 | 2.014E-01 |
| A12 | 5.316E-01 | -5.418E-01 | -1.143E+00 |
| A13 | -1.551E+00 | -3.358E-01 | -1.058E+00 |
| A14 | -2.579E+00 | 2.586E-01 | -1.684E-01 |
| A15 | -6.064E-01 | 4.214E-01 | 6.441E-01 |
| A16 | 2.441E+00 | 1.344E-01 | 6.909E-01 |
| A17 | 3.328E+00 | -1.808E-01 | 3.071E-02 |
| A18 | -1.367E-01 | -2.231E-01 | -5.148E-01 |
| A19 | -5.351E+00 | -5.369E-03 | -4.275E-01 |
| A20 | 2.552E+00 | 1.023E-01 | 5.328E-01 |
| | FIFTH SURFACE | SIXTH SURFACE | SEVENTH SURFACE |
| K | 0.000E+00 | 0.000E+00 | 0.000E+00 |
| A3 | -3.625E-01 | -4.127E-01 | -2.870E-02 |
| A4 | -1.296E-01 | -2.608E-01 | -2.064E-01 |
| A5 | 2.773E-01 | 3.425E-01 | 3.141E-02 |
| A6 | 4.624E-02 | -1.494E-02 | 6.332E-02 |
| A7 | -1.291E-01 | -5.659E-02 | -2.836E-03 |
| A8 | -9.691E-02 | -1.007E-02 | -1.284E-02 |
| A9 | 1.358E-03 | 7.727E-03 | -6.578E-03 |
| A10 | 6.313E-02 | 5.760E-03 | 3.098E-03 |
| A11 | 6.406E-02 | -3.109E-04 | 1.458E-03 |
| A12 | 2.223E-02 | -1.407E-03 | -6.114E-05 |
| A13 | -2.044E-02 | -5.335E-05 | -1.577E-04 |
| A14 | -3.905E-02 | 1.112E-04 | -8.921E-05 |
| A15 | -2.640E-02 | -1.594E-05 | 1.499E-05 |
| A16 | 7.219E-03 | 3.878E-05 | 4.098E-06 |
| A17 | 3.389E-02 | 2.881E-06 | 2.872E-06 |
| A18 | 1.915E-02 | -1.126E-05 | 6.195E-07 |
| A19 | -3.993E-02 | 1.720E-06 | -8.448E-07 |
| A20 | 1.212E-02 | 1.719E-07 | 1.231E-07 |

FIG. 10

| EXAMPLE 2: LENS DATA ||||| 
|---|---|---|---|---|
| Si (SURFACE NUMBER) | Ri (RADIUS OF CURVATURE) | Di (ON-AXIS SURFACE SPACING) | Ndj (REFRACTIVE INDEX) | $\nu$dj (ABBE NUMBER) |
| 1 | 1.273 | 0.70 | 1.471 | 76.6 |
| 2 | 4.522 | 0.07 | | |
| 3 (APERTURE STOP) | — | 1.11 | | |
| 4 | −0.990 | 0.55 | 1.604 | 27.2 |
| 5 | −8.374 | 0.10 | | |
| 6 | 0.992 | 1.14 | 1.531 | 55.5 |
| 7 | 2.212 | 0.70 | | |
| 8 | ∞ | 0.30 | 1.516 | 64.1 |
| 9 | ∞ | 0.38 | | |

(f=4.59, FNo.=2.8)

FIG. 11

| EXAMPLE 2: ASPHERIC SURFACE DATA ||||
| ASPHERIC SURFACE COEFFICIENT | SURFACE NUMBER |||
| | FIRST SURFACE | SECOND SURFACE | FOURTH SURFACE |
|---|---|---|---|
| K | 0.000E+00 | 0.000E+00 | 0.000E+00 |
| A3 | -1.474E-02 | -9.105E-03 | -1.052E-02 |
| A4 | 1.122E-01 | 1.137E-01 | 1.481E-01 |
| A5 | 4.009E-02 | -3.581E-01 | -8.058E-01 |
| A6 | -7.111E-01 | 6.510E-01 | 9.302E-01 |
| A7 | 1.884E+00 | -2.821E-01 | -6.057E-01 |
| A8 | -1.291E+00 | -5.081E-01 | -1.080E+00 |
| A9 | -1.407E+00 | 2.464E-01 | 6.906E-01 |
| A10 | 9.543E-01 | 6.390E-01 | 1.500E+00 |
| A11 | 1.921E+00 | 1.616E-02 | 1.901E-01 |
| A12 | 5.560E-01 | -5.711E-01 | -1.146E+00 |
| A13 | -1.539E+00 | -3.608E-01 | -1.046E+00 |
| A14 | -2.583E+00 | 2.407E-01 | -1.469E-01 |
| A15 | -6.225E-01 | 4.096E-01 | 6.665E-01 |
| A16 | 2.422E+00 | 1.272E-01 | 7.079E-01 |
| A17 | 3.312E+00 | -1.851E-01 | 3.982E-02 |
| A18 | -1.444E-01 | -2.257E-01 | -5.135E-01 |
| A19 | -5.348E+00 | -6.974E-03 | -4.326E-01 |
| A20 | 2.567E+00 | 1.012E-01 | 5.231E-01 |
| | FIFTH SURFACE | SIXTH SURFACE | SEVENTH SURFACE |
| K | 0.000E+00 | 0.000E+00 | 0.000E+00 |
| A3 | -3.912E-01 | -4.405E-01 | 3.512E-02 |
| A4 | -1.642E-01 | -2.564E-01 | -2.189E-01 |
| A5 | 2.749E-01 | 3.396E-01 | 2.494E-02 |
| A6 | 5.247E-02 | -1.540E-02 | 6.329E-02 |
| A7 | -1.250E-01 | -5.556E-02 | -1.885E-03 |
| A8 | -9.567E-02 | -9.367E-03 | -1.234E-02 |
| A9 | 1.608E-03 | 7.859E-03 | -6.478E-03 |
| A10 | 6.384E-02 | 5.657E-03 | 3.062E-03 |
| A11 | 6.533E-02 | -4.279E-04 | 1.418E-03 |
| A12 | 2.340E-02 | -1.460E-03 | -7.894E-05 |
| A13 | -1.991E-02 | -6.080E-05 | -1.609E-04 |
| A14 | -3.912E-02 | 1.188E-04 | -8.750E-05 |
| A15 | -2.677E-02 | -8.816E-06 | 1.688E-05 |
| A16 | 6.849E-03 | 4.217E-05 | 4.919E-06 |
| A17 | 3.365E-02 | 2.780E-06 | 2.922E-06 |
| A18 | 1.906E-02 | -1.189E-05 | 4.639E-07 |
| A19 | -3.990E-02 | 1.271E-06 | -9.499E-07 |
| A20 | 1.223E-02 | 3.341E-07 | 1.577E-07 |

FIG. 12

| EXAMPLE 3: LENS DATA | | | | |
|---|---|---|---|---|
| Si (SURFACE NUMBER) | Ri (RADIUS OF CURVATURE) | Di (ON-AXIS SURFACE SPACING) | Ndj (REFRACTIVE INDEX) | νdj (ABBE NUMBER) |
| 1 | 1.231 | 0.70 | 1.439 | 94.9 |
| 2 | 4.915 | 0.07 | | |
| 3 (APERTURE STOP) | — | 1.12 | | |
| 4 | -1.007 | 0.60 | 1.604 | 27.2 |
| 5 | -3.165 | 0.10 | | |
| 6 | 1.101 | 0.98 | 1.531 | 55.5 |
| 7 | 1.589 | 0.70 | | |
| 8 | ∞ | 0.30 | 1.516 | 64.1 |
| 9 | ∞ | 0.36 | | |

(f=4.48, FNo.=2.8)

FIG. 13

| EXAMPLE 3: ASPHERIC SURFACE DATA ||||
|---|---|---|---|
| ASPHERIC SURFACE COEFFICIENT | SURFACE NUMBER |||
| | FIRST SURFACE | SECOND SURFACE | FOURTH SURFACE |
| K | 0.000E+00 | 0.000E+00 | 0.000E+00 |
| A3 | -2.368E-03 | -6.602E-03 | -4.204E-02 |
| A4 | 8.144E-02 | 1.126E-01 | 1.707E-01 |
| A5 | 9.247E-02 | -3.466E-01 | -7.637E-01 |
| A6 | -7.204E-01 | 6.746E-01 | 9.486E-01 |
| A7 | 1.858E+00 | -2.736E-01 | -6.181E-01 |
| A8 | -1.282E+00 | -5.220E-01 | -1.109E+00 |
| A9 | -1.378E+00 | 2.308E-01 | 6.698E-01 |
| A10 | 9.659E-01 | 6.406E-01 | 1.504E+00 |
| A11 | 1.909E+00 | 3.309E-02 | 2.170E-01 |
| A12 | 5.365E-01 | -5.494E-01 | -1.113E+00 |
| A13 | -1.550E+00 | -3.417E-01 | -1.024E+00 |
| A14 | -2.580E+00 | 2.546E-01 | -1.406E-01 |
| A15 | -6.081E-01 | 4.189E-01 | 6.604E-01 |
| A16 | 2.440E+00 | 1.330E-01 | 6.956E-01 |
| A17 | 3.327E+00 | -1.816E-01 | 2.627E-02 |
| A18 | -1.372E-01 | -2.235E-01 | -5.254E-01 |
| A19 | -5.351E+00 | -5.579E-03 | -4.417E-01 |
| A20 | 2.552E+00 | 1.022E-01 | 5.169E-01 |
| | FIFTH SURFACE | SIXTH SURFACE | SEVENTH SURFACE |
| K | 0.000E+00 | 0.000E+00 | 0.000E+00 |
| A3 | -3.567E-01 | -4.188E-01 | -3.649E-02 |
| A4 | -1.339E-01 | -2.549E-01 | -2.098E-01 |
| A5 | 2.779E-01 | 3.435E-01 | 3.159E-02 |
| A6 | 4.808E-02 | -1.501E-02 | 6.384E-02 |
| A7 | -1.278E-01 | -5.678E-02 | -2.600E-03 |
| A8 | -9.605E-02 | -1.025E-02 | -1.278E-02 |
| A9 | 1.948E-03 | 7.604E-03 | -6.578E-03 |
| A10 | 6.353E-02 | 5.700E-03 | 3.090E-03 |
| A11 | 6.425E-02 | -3.288E-04 | 1.454E-03 |
| A12 | 2.221E-02 | -1.405E-03 | -6.261E-05 |
| A13 | -2.059E-02 | -4.678E-05 | -1.580E-04 |
| A14 | -3.921E-02 | 1.161E-04 | -8.914E-05 |
| A15 | -2.652E-02 | -1.383E-05 | 1.507E-05 |
| A16 | 7.155E-03 | 3.913E-05 | 4.117E-06 |
| A17 | 3.387E-02 | 2.543E-06 | 2.860E-06 |
| A18 | 1.916E-02 | -1.155E-05 | 6.164E-07 |
| A19 | -3.991E-02 | 1.648E-06 | -8.437E-07 |
| A20 | 1.214E-02 | 2.233E-07 | 1.232E-07 |

FIG. 14

| EXAMPLE 4: LENS DATA | | | | |
|---|---|---|---|---|
| Si (SURFACE NUMBER) | Ri (RADIUS OF CURVATURE) | Di (ON-AXIS SURFACE SPACING) | Ndj (REFRACTIVE INDEX) | $\nu dj$ (ABBE NUMBER) |
| 1 | 1.172 | 0.71 | 1.439 | 94.9 |
| 2 | 5.282 | 0.07 | | |
| 3 (APERTURE STOP) | — | 1.05 | | |
| 4 | -1.035 | 0.69 | 1.604 | 27.2 |
| 5 | -5.039 | 0.10 | | |
| 6 | 1.178 | 1.00 | 1.531 | 55.5 |
| 7 | 1.935 | 0.70 | | |
| 8 | ∞ | 0.30 | 1.516 | 64.1 |
| 9 | ∞ | 0.31 | | |

(f=4.60, FNo.=2.8)

FIG. 15

| | EXAMPLE 4: ASPHERIC SURFACE DATA | | |
|---|---|---|---|
| ASPHERIC SURFACE COEFFICIENT | SURFACE NUMBER | | |
| | SECOND SURFACE | THIRD SURFACE | FOURTH SURFACE |
| K | 0.000E+00 | 0.000E+00 | 0.000E+00 |
| A3 | -1.552E-02 | -8.957E-03 | -1.994E-02 |
| A4 | 1.246E-01 | 1.101E-01 | 1.241E-01 |
| A5 | 6.014E-02 | -3.325E-01 | -8.025E-01 |
| A6 | -7.433E-01 | 6.709E-01 | 9.350E-01 |
| A7 | 1.874E+00 | -2.990E-01 | -6.055E-01 |
| A8 | -1.253E+00 | -5.466E-01 | -1.082E+00 |
| A9 | -1.365E+00 | 2.253E-01 | 6.888E-01 |
| A10 | 9.590E-01 | 6.515E-01 | 1.492E+00 |
| A11 | 1.893E+00 | 4.881E-02 | 1.664E-01 |
| A12 | 5.229E-01 | -5.362E-01 | -1.187E+00 |
| A13 | -1.556E+00 | -3.330E-01 | -1.095E+00 |
| A14 | -2.580E+00 | 2.597E-01 | -1.892E-01 |
| A15 | -6.037E-01 | 4.216E-01 | 6.396E-01 |
| A16 | 2.446E+00 | 1.343E-01 | 6.988E-01 |
| A17 | 3.332E+00 | -1.810E-01 | 4.650E-02 |
| A18 | -1.339E-01 | -2.233E-01 | -4.948E-01 |
| A19 | -5.351E+00 | -5.476E-03 | -4.060E-01 |
| A20 | 2.548E+00 | 1.022E-01 | 5.541E-01 |
| | FIFTH SURFACE | SIXTH SURFACE | SEVENTH SURFACE |
| K | 0.000E+00 | 0.000E+00 | 0.000E+00 |
| A3 | -3.597E-01 | -4.124E-01 | -1.315E-02 |
| A4 | -1.340E-01 | -2.533E-01 | -2.077E-01 |
| A5 | 2.794E-01 | 3.414E-01 | 3.084E-02 |
| A6 | 4.930E-02 | -1.709E-02 | 6.328E-02 |
| A7 | -1.280E-01 | -5.770E-02 | -2.833E-03 |
| A8 | -9.755E-02 | -1.034E-02 | -1.285E-02 |
| A9 | -3.724E-05 | 7.813E-03 | -6.595E-03 |
| A10 | 6.195E-02 | 5.928E-03 | 3.090E-03 |
| A11 | 6.351E-02 | -1.849E-04 | 1.456E-03 |
| A12 | 2.223E-02 | -1.342E-03 | -6.115E-05 |
| A13 | -2.020E-02 | -3.524E-05 | -1.575E-04 |
| A14 | -3.880E-02 | 1.048E-04 | -8.925E-05 |
| A15 | -2.624E-02 | -2.834E-05 | 1.491E-05 |
| A16 | 7.297E-03 | 3.017E-05 | 4.022E-06 |
| A17 | 3.392E-02 | 3.195E-07 | 2.864E-06 |
| A18 | 1.915E-02 | -9.786E-06 | 6.501E-07 |
| A19 | -3.995E-02 | 3.859E-06 | -8.174E-07 |
| A20 | 1.210E-02 | -4.831E-07 | 1.129E-07 |

FIG. 16

| EXAMPLE 5: LENS DATA | | | | |
|---|---|---|---|---|
| Si (SURFACE NUMBER) | Ri (RADIUS OF CURVATURE) | Di (ON-AXIS SUR-FACE SPACING) | Ndj (REFRACTIVE INDEX) | $\nu$dj (ABBE NUMBER) |
| 1 (APERTURE STOP) | — | 0.00 | | |
| 2 | 1.437 | 0.70 | 1.471 | 76.6 |
| 3 | 9.980 | 1.15 | | |
| 4 | −1.384 | 0.55 | 1.650 | 25 |
| 5 | 15.955 | 0.10 | | |
| 6 | 0.953 | 1.24 | 1.531 | 55.5 |
| 7 | 1.678 | 0.70 | | |
| 8 | ∞ | 0.30 | 1.516 | 64.1 |
| 9 | ∞ | 0.22 | | |

(f=4.47, FNo.=2.8)

FIG. 17

| EXAMPLE 5: ASPHERIC SURFACE DATA ||||
| ASPHERIC SURFACE COEFFICIENT | SURFACE NUMBER |||
| | SECOND SURFACE | THIRD SURFACE | FOURTH SURFACE |
|---|---|---|---|
| K | 0.000E+00 | 0.000E+00 | 0.000E+00 |
| A3 | -2.679E-03 | -7.657E-03 | 1.667E-03 |
| A4 | 4.361E-02 | 7.756E-02 | 6.653E-02 |
| A5 | 5.406E-02 | -3.397E-01 | -7.427E-01 |
| A6 | -6.244E-01 | 5.783E-01 | 1.113E+00 |
| A7 | 1.793E+00 | -3.031E-01 | -4.680E-01 |
| A8 | -1.392E+00 | -4.702E-01 | -1.132E+00 |
| A9 | -1.383E+00 | 2.642E-01 | 4.444E-01 |
| A10 | 1.039E+00 | 6.121E-01 | 1.230E+00 |
| A11 | 1.963E+00 | -2.335E-02 | 1.188E-01 |
| A12 | 5.372E-01 | -5.976E-01 | -9.502E-01 |
| A13 | -1.583E+00 | -3.689E-01 | -7.285E-01 |
| A14 | -2.618E+00 | 2.450E-01 | 9.807E-02 |
| A15 | -6.367E-01 | 4.199E-01 | 7.410E-01 |
| A16 | 2.421E+00 | 1.392E-01 | 6.266E-01 |
| A17 | 3.313E+00 | -1.740E-01 | -1.220E-01 |
| A18 | -1.469E-01 | -2.179E-01 | -6.691E-01 |
| A19 | -5.349E+00 | -4.945E-03 | -5.107E-01 |
| A20 | 2.578E+00 | 9.473E-02 | 5.686E-01 |
| | FIFTH SURFACE | SIXTH SURFACE | SEVENTH SURFACE |
| K | 0.000E+00 | 0.000E+00 | 0.000E+00 |
| A3 | -4.382E-01 | -5.705E-01 | -4.645E-02 |
| A4 | -1.791E-01 | -2.442E-01 | -1.845E-01 |
| A5 | 3.015E-01 | 3.605E-01 | 2.831E-02 |
| A6 | 8.407E-02 | -4.358E-03 | 6.031E-02 |
| A7 | -1.134E-01 | -5.321E-02 | -3.212E-03 |
| A8 | -1.014E-01 | -1.140E-02 | -1.226E-02 |
| A9 | -1.034E-02 | 5.343E-03 | -6.211E-03 |
| A10 | 5.382E-02 | 4.220E-03 | 3.145E-03 |
| A11 | 6.006E-02 | -8.406E-04 | 1.405E-03 |
| A12 | 2.209E-02 | -1.350E-03 | -1.036E-04 |
| A13 | -1.919E-02 | 1.732E-04 | -1.722E-04 |
| A14 | -3.780E-02 | 2.967E-04 | -8.925E-05 |
| A15 | -2.553E-02 | 7.485E-05 | 2.095E-05 |
| A16 | 7.762E-03 | 5.671E-05 | 6.603E-06 |
| A17 | 3.419E-02 | -1.431E-05 | 1.952E-06 |
| A18 | 1.925E-02 | -3.252E-05 | 4.752E-07 |
| A19 | -3.998E-02 | -8.052E-06 | -9.382E-07 |
| A20 | 1.195E-02 | 6.491E-06 | 1.607E-07 |

FIG. 18

| EXAMPLE 6: LENS DATA | | | | |
|---|---|---|---|---|
| Si (SURFACE NUMBER) | Ri (RADIUS OF CURVATURE) | Di (ON-AXIS SURFACE SPACING) | Ndj (REFRACTIVE INDEX) | $\nu dj$ (ABBE NUMBER) |
| 1 | 1.265 | 0.70 | 1.497 | 81.6 |
| 2 | 4.005 | 0.08 | | |
| 3 (APERTURE STOP) | — | 1.06 | | |
| 4 | -1.188 | 0.48 | 1.750 | 20 |
| 5 | -17.444 | 0.10 | | |
| 6 | 0.938 | 1.14 | 1.531 | 55.5 |
| 7 | 2.503 | 0.70 | | |
| 8 | ∞ | 0.30 | 1.516 | 64.1 |
| 9 | ∞ | 0.34 | | |

(f=4.46, FNo.=2.8)

FIG. 19

| EXAMPLE 6: ASPHERIC SURFACE DATA |||| 
|---|---|---|---|
| ASPHERIC SURFACE COEFFICIENT | SURFACE NUMBER |||
| | FIRST SURFACE | SECOND SURFACE | FOURTH SURFACE |
| K | 0.000E+00 | 0.000E+00 | 0.000E+00 |
| A3 | -1.365E-02 | -7.826E-03 | -4.032E-02 |
| A4 | 1.126E-01 | 1.156E-01 | 1.654E-01 |
| A5 | 3.892E-02 | -3.553E-01 | -7.866E-01 |
| A6 | -7.035E-01 | 6.549E-01 | 9.431E-01 |
| A7 | 1.888E+00 | -2.762E-01 | -5.997E-01 |
| A8 | -1.296E+00 | -5.009E-01 | -1.080E+00 |
| A9 | -1.412E+00 | 2.524E-01 | 6.875E-01 |
| A10 | 9.542E-01 | 6.424E-01 | 1.496E+00 |
| A11 | 1.926E+00 | 1.736E-02 | 1.857E-01 |
| A12 | 5.618E-01 | -5.711E-01 | -1.150E+00 |
| A13 | -1.535E+00 | -3.612E-01 | -1.050E+00 |
| A14 | -2.582E+00 | 2.402E-01 | -1.506E-01 |
| A15 | -6.229E-01 | 4.092E-01 | 6.626E-01 |
| A16 | 2.421E+00 | 1.269E-01 | 7.039E-01 |
| A17 | 3.310E+00 | -1.853E-01 | 3.593E-02 |
| A18 | -1.459E-01 | -2.258E-01 | -5.172E-01 |
| A19 | -5.348E+00 | -6.991E-03 | -4.359E-01 |
| A20 | 2.566E+00 | 1.012E-01 | 5.201E-01 |
| | FIFTH SURFACE | SIXTH SURFACE | SEVENTH SURFACE |
| K | 0.000E+00 | 0.000E+00 | 0.000E+00 |
| A3 | -3.615E-01 | -4.768E-01 | 4.859E-02 |
| A4 | -1.682E-01 | -2.587E-01 | -2.192E-01 |
| A5 | 2.682E-01 | 3.407E-01 | 2.383E-02 |
| A6 | 4.828E-02 | -1.482E-02 | 6.280E-02 |
| A7 | -1.268E-01 | -5.530E-02 | -2.042E-03 |
| A8 | -9.612E-02 | -9.193E-03 | -1.239E-02 |
| A9 | 1.784E-03 | 7.993E-03 | -6.490E-03 |
| A10 | 6.418E-02 | 5.746E-03 | 3.057E-03 |
| A11 | 6.561E-02 | -3.600E-04 | 1.416E-03 |
| A12 | 2.355E-02 | -1.443E-03 | -7.989E-05 |
| A13 | -1.987E-02 | -6.194E-05 | -1.612E-04 |
| A14 | -3.913E-02 | 1.109E-04 | -8.756E-05 |
| A15 | -2.679E-02 | -1.664E-05 | 1.692E-05 |
| A16 | 6.832E-03 | 3.756E-05 | 4.969E-06 |
| A17 | 3.365E-02 | 1.677E-06 | 2.960E-06 |
| A18 | 1.906E-02 | -1.073E-05 | 4.910E-07 |
| A19 | -3.990E-02 | 2.640E-06 | -9.395E-07 |
| A20 | 1.223E-02 | -1.340E-07 | 1.507E-07 |

FIG. 20

| EXAMPLE 7: LENS DATA ||||||
|---|---|---|---|---|
| Si (SURFACE NUMBER) | Ri (RADIUS OF CURVATURE) | Di (ON-AXIS SUR-FACE SPACING) | Ndj (REFRACTIVE INDEX) | $\nu$dj (ABBE NUMBER) |
| 1 | 1.226 | 0.70 | 1.439 | 94.9 |
| 2 | 5.106 | 0.07 | | |
| 3(APERTURE STOP) | — | 1.11 | | |
| 4 | -0.999 | 0.61 | 1.604 | 27.2 |
| 5 | -2.982 | 0.10 | | |
| 6 | 1.149 | 0.99 | 1.531 | 55.5 |
| 7 | 1.619 | 0.70 | | |
| 8 | ∞ | 0.30 | 1.516 | 64.1 |
| 9 | ∞ | 0.35 | | |

(f=4.49, FNo.=2.8)

FIG. 21

| EXAMPLE 7: ASPHERIC SURFACE DATA ||||
|---|---|---|---|
| ASPHERIC SURFACE COEFFICIENT | SURFACE NUMBER |||
| | FIRST SURFACE | SECOND SURFACE | FOURTH SURFACE |
| K | 0.000E+00 | 0.000E+00 | 0.000E+00 |
| A3 | -3.696E-03 | -7.183E-03 | -4.206E-02 |
| A4 | 8.247E-02 | 1.115E-01 | 1.671E-01 |
| A5 | 9.463E-02 | -3.480E-01 | -7.655E-01 |
| A6 | -7.241E-01 | 6.720E-01 | 9.489E-01 |
| A7 | 1.853E+00 | -2.764E-01 | -6.175E-01 |
| A8 | -1.283E+00 | -5.241E-01 | -1.109E+00 |
| A9 | -1.375E+00 | 2.292E-01 | 6.666E-01 |
| A10 | 9.700E-01 | 6.391E-01 | 1.499E+00 |
| A11 | 1.911E+00 | 3.163E-02 | 2.117E-01 |
| A12 | 5.359E-01 | -5.507E-01 | -1.116E+00 |
| A13 | -1.552E+00 | -3.427E-01 | -1.025E+00 |
| A14 | -2.582E+00 | 2.540E-01 | -1.404E-01 |
| A15 | -6.104E-01 | 4.185E-01 | 6.614E-01 |
| A16 | 2.438E+00 | 1.327E-01 | 6.968E-01 |
| A17 | 3.326E+00 | -1.817E-01 | 2.735E-02 |
| A18 | -1.374E-01 | -2.236E-01 | -5.246E-01 |
| A19 | -5.351E+00 | -5.622E-03 | -4.411E-01 |
| A20 | 2.552E+00 | 1.021E-01 | 5.172E-01 |
| | FIFTH SURFACE | SIXTH SURFACE | SEVENTH SURFACE |
| K | 0.000E+00 | 0.000E+00 | 0.000E+00 |
| A3 | -3.504E-01 | -4.124E-01 | -3.636E-02 |
| A4 | -1.308E-01 | -2.532E-01 | -2.097E-01 |
| A5 | 2.792E-01 | 3.438E-01 | 3.161E-02 |
| A6 | 4.828E-02 | -1.513E-02 | 6.382E-02 |
| A7 | -1.280E-01 | -5.694E-02 | -2.620E-03 |
| A8 | -9.626E-02 | -1.034E-02 | -1.278E-02 |
| A9 | 1.895E-03 | 7.578E-03 | -6.576E-03 |
| A10 | 6.362E-02 | 5.707E-03 | 3.094E-03 |
| A11 | 6.437E-02 | -3.132E-04 | 1.456E-03 |
| A12 | 2.230E-02 | -1.394E-03 | -6.184E-05 |
| A13 | -2.056E-02 | -4.194E-05 | -1.579E-04 |
| A14 | -3.923E-02 | 1.163E-04 | -8.931E-05 |
| A15 | -2.655E-02 | -1.540E-05 | 1.493E-05 |
| A16 | 7.130E-03 | 3.768E-05 | 4.051E-06 |
| A17 | 3.386E-02 | 1.967E-06 | 2.850E-06 |
| A18 | 1.915E-02 | -1.136E-05 | 6.297E-07 |
| A19 | -3.991E-02 | 2.031E-06 | -8.325E-07 |
| A20 | 1.215E-02 | 1.117E-07 | 1.197E-07 |

FIG. 22
|  | CONDITIONAL EXPRESSION (1) f1/f | CONDITIONAL EXPRESSION (2) \|f2/f\| | CONDITIONAL EXPRESSION (3) νd1 | CONDITIONAL EXPRESSION (4) TL/2Y | CONDITIONAL EXPRESSION (5) f3/f | CONDITIONAL EXPRESSION (6) Nd2 |
|---|---|---|---|---|---|---|
| EXAMPLE 1 | 0.75 | 0.56 | 94.9 | 0.85 | 0.89 | 1.604 |
| EXAMPLE 2 | 0.77 | 0.42 | 76.6 | 0.87 | 0.56 | 1.604 |
| EXAMPLE 3 | 0.79 | 0.61 | 94.9 | 0.85 | 0.89 | 1.604 |
| EXAMPLE 4 | 0.71 | 0.50 | 94.9 | 0.85 | 0.84 | 1.604 |
| EXAMPLE 5 | 0.78 | 0.43 | 76.6 | 0.86 | 0.58 | 1.650 |
| EXAMPLE 6 | 0.77 | 0.39 | 81.6 | 0.85 | 0.51 | 1.750 |
| EXAMPLE 7 | 0.78 | 0.63 | 94.9 | 0.85 | 0.96 | 1.604 |
EXAMPLE 1
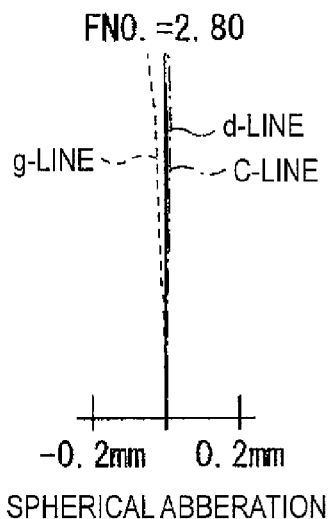
FNO.=2.80
g-LINE
d-LINE
C-LINE
-0.2mm    0.2mm
SPHERICAL ABBERATION
FIG. 23A
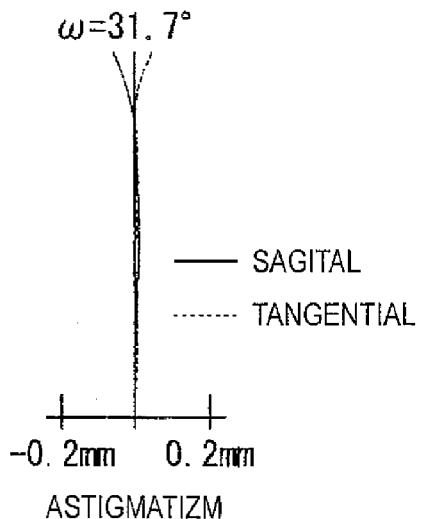
ω=31.7°
—— SAGITAL
------ TANGENTIAL
-0.2mm    0.2mm
ASTIGMATIZM
FIG. 23B
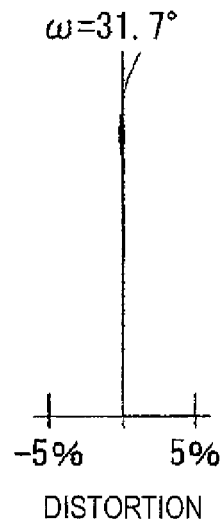
ω=31.7°
-5%    5%
DISTORTION
FIG. 23C

EXAMPLE 2

SPHERICAL ABBERATION

ASTIGMATIZM

DISTORTION

EXAMPLE 3

SPHERICAL ABBERATION

ASTIGMATIZM

DISTORTION

EXAMPLE 4

SPHERICAL ABBERATION

ASTIGMATIZM

DISTORTION

EXAMPLE 5

SPHERICAL ABBERATION

ASTIGMATIZM

DISTORTION

EXAMPLE 6

SPHERICAL ABERRATION

ASTIGMATIZM

DISTORTION

EXAMPLE 7

SPHERICAL ABERRATION

ASTIGMATIZM

DISTORTION

IMAGING LENS, CAMERA MODULE, AND PORTABLE TERMINAL APPARATUS

BACKGROUND OF THE INVENTION

1. Field of the Invention

The present invention relates to a fixed-focus imaging lens which is suitable for use in small imaging apparatus as exemplified by digital cameras using an imaging device such as a CCD (charge-coupled device) or a CMOS (complementary metal oxide semiconductor) sensor and cameras using a silver salt film.

The invention also relates to a camera module which converts an optical image formed by the above imaging lens into an imaging signal and to a portable terminal apparatus such as a cell phone with a camera or a personal digital assistant (PDA) which incorporates the above imaging lens and performs shooting.

2. Description of the Related Art

In recent years, with the spread of personal computers to homes etc., digital still cameras (hereinafter referred to simply as digital cameras) capable of inputting image information obtained by shooting a scene, a person, or the like to a personal computer have spread rapidly. Furthermore, many cell phones have come to incorporate a module camera for image input (cell phone module camera).

Such imaging apparatus employ an imaging device such as a CCD or a CMOS sensor. In recent years, these imaging devices have become more compact and increased compactness has come to be required also for the entire imaging apparatus and an imaging lens mounted therein. At the same time, the number of pixels of imaging devices has been increased and imaging lenses have come to be required to be increased in resolution and performance.

In the above circumstances, JP-A-2004-302058, JP-A-2005-173319, JP-A-2005-227755 and JP-A-2005-292235 disclose imaging lenses which employ a three-lens structure and aspheric lens surfaces and are thereby increased in compactness and performance.

As described above, recent imaging devices have been reduced in size and increased in the number of pixels and, accordingly, a high resolution an increased compactness have come to be required for imaging lenses for digital cameras. On the other hand, recently, imaging lenses of cell phone module cameras, which were mainly required to be compact and of a low cost in the past, have also come to be required to be increased in performance with a tendency of increase in the number of pixels of imaging devices.

As a result, it is now desired to develop a wide variety of lenses that are improved in a total sense in terms of image forming performance and compactness. For example, it is now desired to develop high-performance imaging lenses which are compact enough to be incorporated in cell phone module cameras whereas exhibiting sufficiently high performance to be incorporated in digital cameras.

One method for satisfying the above requirements is to employ a three-lens structure for the purpose of increase in compactness and positively use aspheric surfaces for the purpose of increase in performance. Although the lenses disclosed in the above Patent documents employ a three-lens structure and aspheric surfaces, they are still insufficient in image forming performance and compactness, for example.

SUMMARY OF THE INVENTION

The present invention has been made in view of the above problems, and an object of the invention is therefore to provide an imaging lens which exhibits high image forming performance though it is particularly reduced in overall length and hence is compact.

The invention provides an imaging lens comprising, in order from an object side: a first lens having a positive refractive power and a meniscus shape and having a convex surface directed to the object side; a second lens having a negative refractive power in the vicinity of an optical axis of the imaging lens; and a third lens having a positive refractive power in the vicinity of the optical axis, wherein at least one surface of each of the second lens and the third lens is an aspheric surface; and the imaging lens satisfies the following conditional expressions:

$$0.7 < |f1/f| < 0.8 \tag{1}$$

$$0.3 < |f2/f| < 0.8 \tag{2}$$

$$75 < {}_v d_1 < 96 \tag{3}$$

$$TL/2Y < 0.9 \tag{4}$$

where f is the focal length of the imaging lens, f1 is the focal length of the first lens, f2 is the focal length of the second lens, ${}_v d_1$ is the Abbe number of the first lens for the d-line (wavelength: 587.6 nm), TL is the length between the object-side surface of the first lens to an image forming position of the imaging lens, and Y is the maximum image height.

In the imaging lens according to the invention, the shape and the refractive power of each lens are set properly and the conditional expressions (1), (2), and (4) are satisfied with a small total number of (i.e., three) lenses. As a result, the refractive power allocation between the first lens and the second lens is optimized and the lens overall length is shortened. In particular, the chromatic aberration is compensated for satisfactorily because the conditional expression (3) is satisfied.

It is preferable that the imaging lens according to the invention satisfy the following conditional expression:

$$0.5 < f3/f < 1.0 \tag{5}$$

where f3 is the focal length of the third lens. This optimizes the power allocation to the third lens, which is advantageous in shortening the lens overall length.

It is preferable that the imaging lens according to the invention be such that the object-side surface of the second lens has an aspheric shape and a negative refractive power increasing from the vicinity of the optical axis toward a periphery, and that the image-side surface of the second lens has an aspheric shape and a positive refractive power decreasing from the vicinity of the optical axis to a periphery. This makes it easier to compensate for various aberrations while shortening the lens overall length.

Furthermore, it is preferable that the imaging lens according to the invention satisfy the following conditional expression:

$$1.68 < Nd_2 \tag{6}$$

where $Nd_2$ is the refractive index of the second lens for the d-line (wavelength: 587.6 nm). With this measure, the material of the second lens is optimized and various aberrations such as the curvature of field are corrected for satisfactorily.

The invention provides a camera module comprising: the imaging lens; and an imaging device that outputs an imaging signal corresponding to an optical image formed by the imaging lens.

The invention provides the portable terminal apparatus comprising the camera module.

BRIEF DESCRIPTION OF THE DRAWINGS

FIG. 9 shows data of aspheric surfaces of the imaging lens according to Example 1;

FIG. 10 shows lens data of the imaging lens according to Example 2;

FIG. 11 shows data of aspheric surfaces of the imaging lens according to Example 2;

FIG. 12 shows lens data of the imaging lens according to Example 3;

FIG. 13 shows data of aspheric surfaces of the imaging lens according to Example 3;

FIG. 14 shows lens data of the imaging lens according to Example 4;

FIG. 15 shows data of aspheric surfaces of the imaging lens according to Example 4;

FIG. 16 shows lens data of the imaging lens according to Example 5;

FIG. 17 shows data of aspheric surfaces of the imaging lens according to Example 5;

FIG. 18 shows lens data of the imaging lens according to Example 6;

FIG. 19 shows data of aspheric surfaces of the imaging lens according to Example 6;

FIG. 20 shows lens data of the imaging lens according to Example 7;

FIG. 21 shows data of aspheric surfaces of the imaging lens according to Example 7;

FIG. 22 is a table summarizing, for each Example, the values of parameters in conditional expressions;

FIGS. 23A to 23C are aberration diagrams showing various aberrations of the imaging lens according to Example 1 of the invention in which FIG. 23A shows spherical aberration, FIG. 23B shows astigmatism, and FIG. 23C shows distortions;

FIGS. 24A to 24C are aberration diagrams showing various aberrations of the imaging lens according to Example 2 of the invention in which FIG. 24A shows spherical aberration, FIG. 24B shows astigmatism, and FIG. 24C shows distortion;

FIGS. 25A to 25C are aberration diagrams showing various aberrations of the imaging lens according to Example 3 of the invention in which FIG. 25A shows spherical aberration, FIG. 25B shows astigmatism, and FIG. 25C shows distortion;

FIGS. 26A to 26C are aberration diagrams showing various aberrations of the imaging lens according to Example 4 of the invention in which FIG. 26A shows spherical aberration, FIG. 26B shows astigmatism, and FIG. 26C shows distortion;

FIGS. 27A to 27C are aberration diagrams showing various aberrations of the imaging lens according to Example 5 of the invention in which FIG. 27A shows spherical aberration, FIGS. 27B shows astigmatism, and FIGS. 27C shows distortion;

FIGS. 28A to 28C are aberration diagrams showing various aberrations of the imaging lens according to Example 6 of the invention in which FIG. 28A shows spherical aberration, FIG. 28B shows astigmatism, and FIG. 28C shows distortion;

FIGS. 29A to 29C are aberration diagrams showing various aberrations of the imaging lens according to Example 7 of the invention in which FIG. 29A shows spherical aberration, FIG. 29B shows astigmatism, and FIG. 29C shows distortion.

DETAILED DESCRIPTION OF THE INVENTION

An embodiment of the present invention will be hereinafter described in detail with reference to the drawings.

Figure 1:
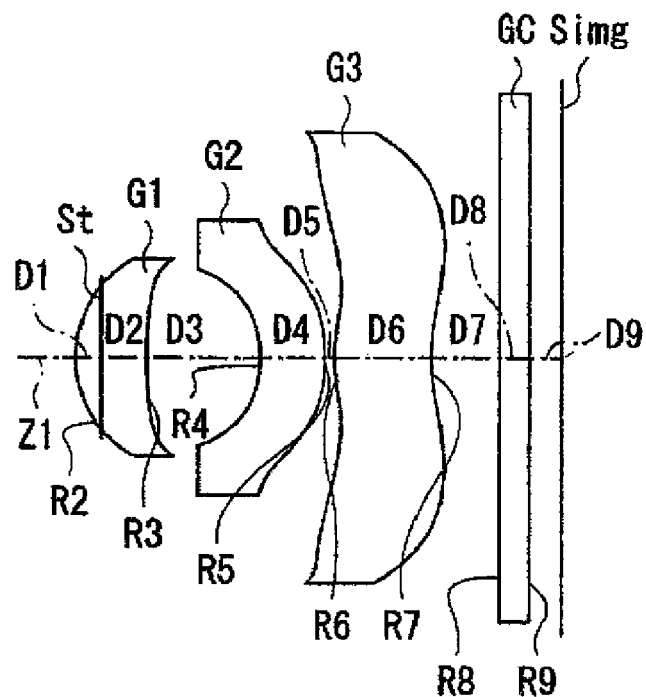
FIG. 1 is a sectional view of an imaging lens according to Example 1 of the present invention.
Figure 2:
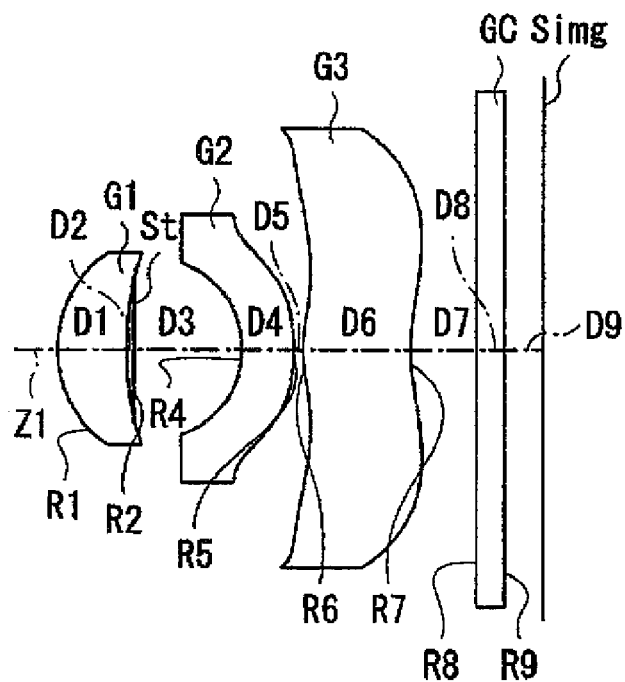
FIG. 2 is a sectional view of an imaging lens according to Example 2 of the invention.
Figure 3:
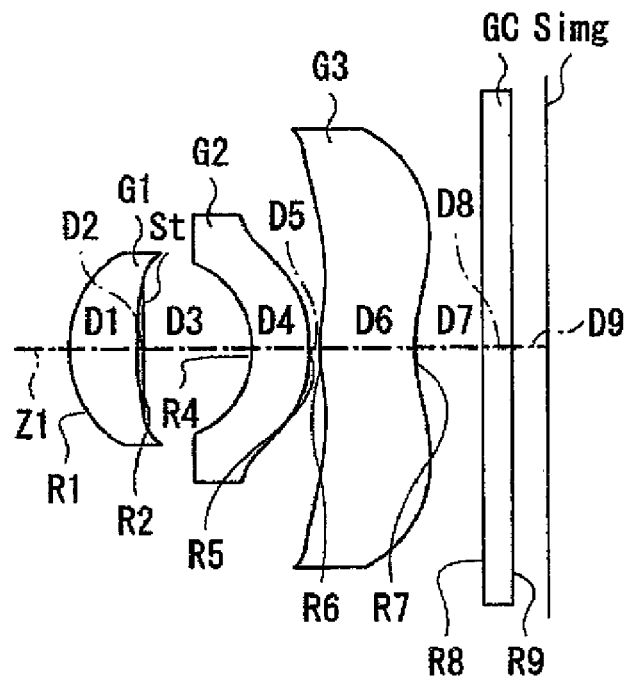
FIG. 3 is a sectional view of an imaging lens according to Example 3 of the invention.
Figure 4:
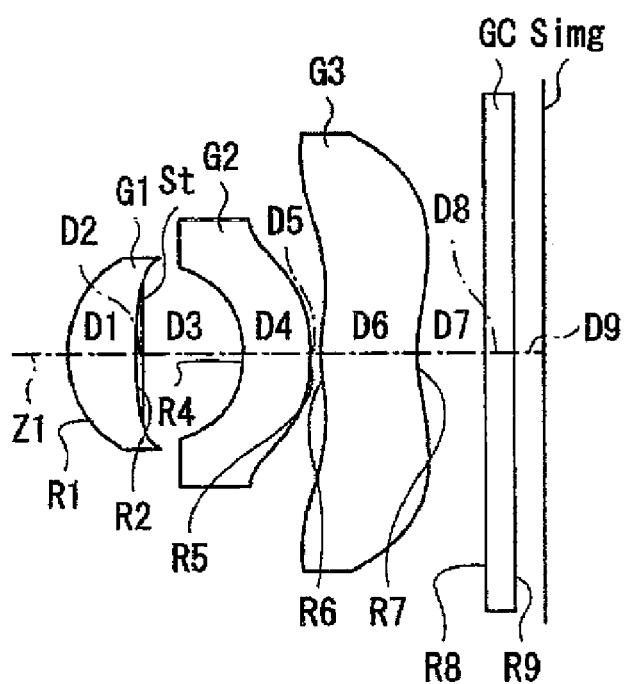
FIG. 4 is a sectional view of an imaging lens according to Example 4 of the invention.
Figure 5:
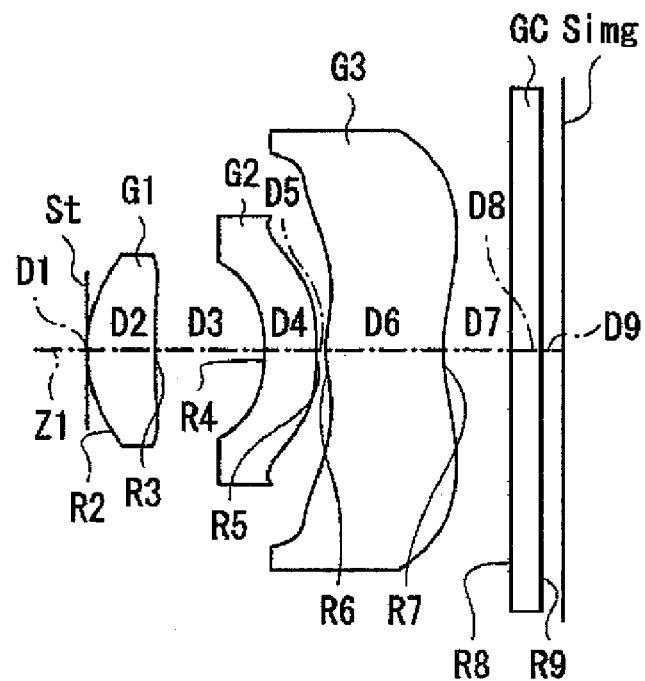
FIG. 5 is a sectional view of an imaging lens according to Example 5 of the invention.
Figure 6:
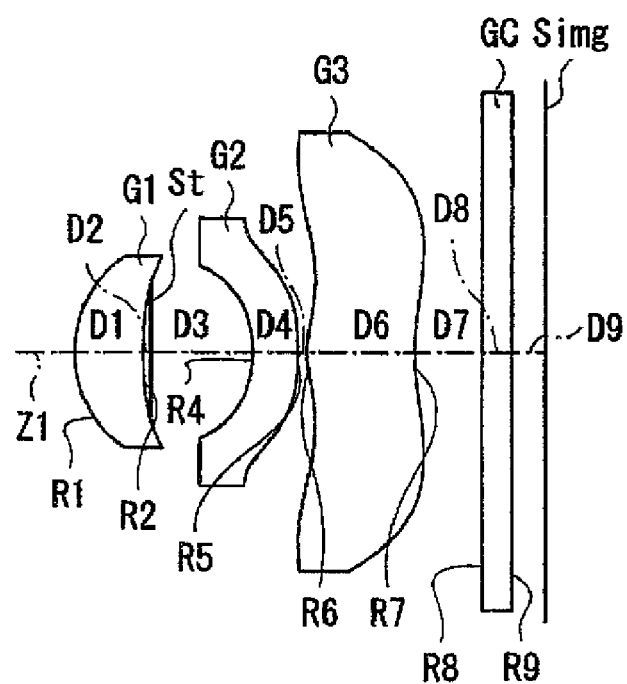
FIG. 6 is a sectional view of an imaging lens according to Example 6 of the invention.
Figures 7, 8:
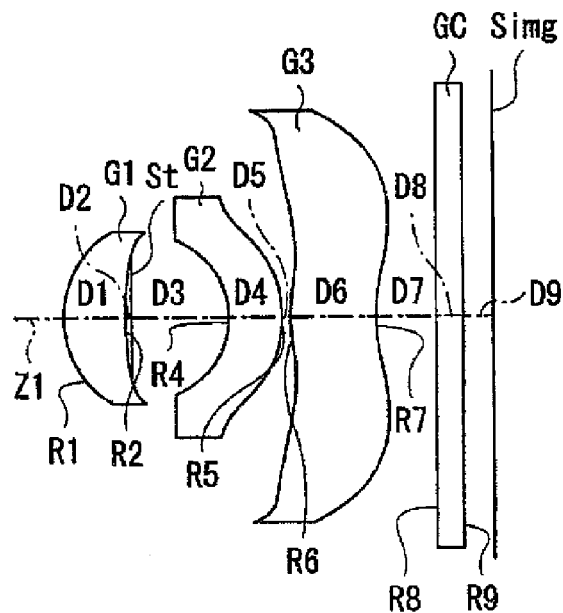
FIG. 7 is a sectional view of an imaging lens according to Example 7 of the invention.
FIG. 8 shows lens data of the imaging lens according to Example 1.

FIG. 1 shows a first exemplary lens configuration of an imaging lens according to an embodiment of the invention. This exemplary lens configuration corresponds to a first numerical example (FIGS. 8 and 9; described later). FIG. 2 shows a second exemplary lens configuration which corresponds to a second numerical example (FIGS. 10 and 11; described later). FIG. 3 shows a third exemplary lens configuration which corresponds to a third numerical example (FIGS. 12 and 13; described later). FIG. 4 shows a fourth exemplary lens configuration which corresponds to a fourth numerical example (FIGS. 14 and 15; described later). FIG. 5 shows a fifth exemplary lens configuration which corresponds to a fifth numerical example (FIGS. 16 and 17; described later). FIG. 6 shows a sixth exemplary lens configuration which corresponds to a sixth numerical example (FIGS. 18 and 19; described later). FIG. 7 shows a seventh exemplary lens configuration which corresponds to a seventh numerical example (FIGS. 20 and 21; described later). In FIGS. 1-7, symbol Ri represents the radius of curvature of an ith surface as numbered in such a manner that the optical element closest to the object is the first and the number increases as the optical element comes closer to the image side (image forming side). Symbol Di represents the surface spacing between ith and (i+1)th surfaces on the optical axis Z1. In FIGS. 1 and 5, a stop St is regarded as the first optical element (i=1) Since the exemplary lens configurations are the same in basic configuration, the following description will be made by basically using the first exemplary lens configuration of FIG. 1.

This imaging lens is suitable for use in various imaging apparatus using an imaging device such as a CCD or a CMOS sensor, as exemplified by digital still cameras, cell phones with a camera, and PDAs. This imaging lens is equipped with a first lens G1, a second lens G2, and a third lens G3 which are arranged along the optical axis Z1 in this order from the object side.

More specifically, the stop St is disposed on the object side of the second lens G2. The stop St is an optical aperture stop and is disposed between the object-side surface and the image-side surface of the first lens G1 in the exemplary configuration of FIG. 1. The stop St is disposed at the position of the apex of the object-side surface of the first lens G1 in the exemplary configuration of FIG. 5, and between the image-side surface of the first lens G1 and the object-side surface of the second lens G2 in the exemplary configurations of FIGS. 2-4, 6, and 7.

An imaging device such as a CCD is disposed in the image forming surface Simg of the imaging lens. One of various optical members GC which is a flat optical member such as a cover glass for protection of the imaging surface or an infrared cutting filter is disposed between the third lens G3 and the imaging device according to the configuration of a camera to which the imaging lens is to be attached.

The first lens G1 has a positive refractive power and is a meniscus lens whose convex surface is located on the object side. The lens material of the first lens G1 is to satisfy a conditional expression (3) (described later) and a low-dispersion glass material such as an ED (extra-low dispersion) lens material is suitable for it.

The second lens G2 has a negative refractive power in the vicinity of the optical axis and at least one of its surfaces is an aspheric surface. In the exemplary configuration of FIG. 1, the second lens G2 is a negative meniscus lens whose concave surface is located on the object side. On the other hand, in the exemplary configuration of FIG. 5, the second lens G2 is a biconcave lens in the vicinity of the optical axis. In this manner, the object-side surface of the second lens G2 has a concave shape. In the second lens G2, it is preferable that the object-side surface have such an aspheric shape that its negative refractive power increases as the position goes away from the vicinity of the optical axis to a periphery, and that the image-side surface have such an aspheric shape that its positive refractive power decreases as the position goes away from the vicinity of the optical axis to a periphery. It is preferable that the lens material of the second lens G2 satisfy a conditional expression (6) (described later). A large-refractive-index material such as a nanocomposite resin material whose refractive index is increased by nanoparticles is suitable for it.

The third lens G3 has a positive refractive power in the vicinity of the optical axis and at least one of its surfaces is an aspheric surface. In the exemplary configuration of FIG. 1, in the vicinity of the optical axis, the third lens G3 is a meniscus lens whose convex surface is located on the object side. The image-side surface of the third lens G3 is concave toward the image side in the vicinity of the optical axis and its peripheral portion is convex toward the image side. On the other hand, the object-side surface of the third lens G3 is an aspheric surface whose portion in the vicinity of the optical axis, intermediate portion, and peripheral portion are convex, concave, and convex toward the object side, respectively.

It is preferable that the second lens G2 and the third lens G3, which are more complex in shape than the first lens G1, be each made of a resin material. This makes it possible to form complex aspheric shapes with high accuracy and to thereby increase the productivity.

The imaging lens satisfies the following conditional expressions:

$$0.7 < |f1/f| < 0.8 \quad (1)$$

$$0.3 < |f2/f| < 0.8 \quad (2)$$

$$75 < \nu d_1 < 96 \quad (3)$$

$$TL/2Y < 0.9 \quad (4)$$

where symbol f is the focal length of the entire system, f1 is the focal length of the first lens G1, f2 is the focal length of the second lens G2, $\nu d_1$ is the Abbe number of the first lens G1 for the d-line, TL is the length between the object-side surface of the first lens G3 to the image forming position, and Y is the maximum image height.

It is preferable that the imaging lens further satisfy the following conditional expression:

$$0.5 < f3/f < 1.0 \quad (5)$$

where f3 is the focal length of the third lens G3.

It is preferable that the imaging lens further satisfy the following conditional expression:

$$1.68 < Nd_2 \quad (6)$$

where $Nd_2$ is the refractive index of the second lens G2 for the d-line.

Next, a description will be made of the workings and the advantages of the imaging lens having the above configuration.

In this imaging lens, the conditional expressions (1), (2), and (4) are satisfied and the shape and the refractive power of each lens are set properly with a small total number of (i.e., three) lenses. As a result, the power allocation between the first lens G1 and the second lens G2 is optimized in a state that the first lens G3 and the second lens G2 are given relatively strong refractive power and the lens overall length is shortened. However, where it is attempted to shorten the lens overall length in this manner, the chromatic aberration is increased and the aberration performance is deteriorated. In view of this, the first lens G1 is made of a lens material that satisfies the conditional expression (3), as a result of which the chromatic aberration is compensated for satisfactorily. High aberration performance is thus maintained while the lens overall length is shortened.

Since the stop St is disposed on the object side of the object-side surface of the second lens G2 on the optical axis, the angle of exit rays directed to the image forming surface is made small and hence high telecentricity is secured, that is, the incident angle of the chief ray directed to the imaging device is made nearly parallel with the optical axis (i.e. angle between the direction of incidence on the imaging surface and the normal to the imaging surface is made approximately zero). On the other hand, the fact that the stop St is disposed on the image side of the apex of the object-side surface of the first lens G1 on the optical axis is advantageous in shortening the overall length over a case that the stop St is disposed on the object side of the apex of the object-side surface of the first lens G1. In general, high telecentricity is required for the purpose of accommodating a high-performance imaging device. Therefore, disposing the stop St in the above manner is advantageous in shortening the lens overall length and attaining high performance.

The feature that the object-side surface of the second lens G2 is shaped so that its negative refractive power increases as the position goes away from the vicinity of the optical axis toward the periphery and the image-side surface of the second lens G2 is shaped so that its positive refractive power decreases as the position goes away from the vicinity of the optical axis toward the periphery optimizes the surface shapes of the second lens G2 and hence is advantageous in shortening the lens overall length and attaining high performance. In particular, the fact that the positive refractive power of the image-side surface of the second lens G2 is weak in its peripheral portion makes it possible to compensate for the peripheral aberrations satisfactorily.

The third lens G3 is different from the first lens G1 and the second lens G2 in that light beams having different angles of view are separated from each other. Therefore, the feature that the image-side surface of the third lens G3 which is the last lens surface that is closest to the imaging device is concave toward the image side in the vicinity of the optical axis and its peripheral portion is convex toward the image side makes it possible to compensate for the aberrations satisfactorily for the individual angles of view and to control the angle of incidence of a light beam on the imaging device so that it is made smaller than a prescribed angle. This not only makes it possible to reduce the light quantity unevenness in the entire image forming surface but also is advantageous in compensating for the curvature of field, the distortion, etc. Furthermore, since the object-side surface of the third lens G3 is shaped in such a manner that its portion in the vicinity of the optical axis, intermediate portion, and peripheral portion are convex, concave, and convex toward the object side, respectively, the peripheral aberrations are compensated for satisfactorily. Specific meanings of the conditional expressions (1)-(6) will be described below.

The conditional expression (1) relates to the focal length f1 of the first lens G1. The parameter |f1/f| being larger the numerical range of the conditional expression (1) is not preferable because it becomes difficult to compensate for the curvature of field. The parameter |f1/f| being smaller than the numerical range is not preferable either because the exit pupil position becomes too short.

The conditional expression (2) relates to the focal length f2 of the second lens G2. The parameter |f2/f| being out of the numerical range of the conditional expression (2) is not preferable because it becomes difficult to compensate for the aberrations while keeping the lens overall length short.

The conditional expression (3) relates to the Abbe number $\nu d_1$ of the first lens G1. The Abbe number $\nu d_1$ being out of the numerical range of the conditional expression (3) is not preferable because it becomes difficult to compensate for the chromatic aberration when the lens overall length is shortened.

The conditional expression (4) relates to the ratio of the overall optical length TL on the optical axis to the maximum image height Y. The parameter TL/2Y being larger than the numerical range of the conditional expression (4) is not preferable because it becomes difficult to shorten the lens system sufficiently.

The conditional expression (5) relates to the focal length f3 of the third lens G3. The parameter f3/f being out of the numerical range of the conditional expression (5) is not preferable because it becomes difficult to compensate for the aberrations.

The conditional expression (6) relates-to the refractive index $ND_2$ of the second lens G2. The refractive index $ND_2$ being out of the numerical range of the conditional expression (6) is not preferable because the compensation of the curvature of field and other aberrations becomes insufficient.

As described above, in the imaging lens according to the embodiment, the prescribed conditional expressions are satisfied and the shape, material, and refractive power of each lens are optimized with a small total number of (i.e., three) lenses. Therefore, a lens system can be realized which exhibits high image forming performance though it is compact.

EXAMPLES

Next, a description will be made of specific numerical examples of the imaging lens according to the embodiment. In the following, first to seventh numerical examples will be described together.

Specific lens data of Example 1 which corresponds to the imaging lens configuration of FIG. 1 are shown in FIGS. 8 and 9. FIG. 8 shows lens data and FIG. 9 shows data of the aspheric surfaces. In the lens data of FIG. 8, surface numbers i (i=1-9) which are numbered in such a manner that the optical element closest to the object is given the number "1" and the number increases in order as the position comes closer to the image side are shown in the column of the surface number Si. The values (mm) of radii of curvature of the respective surfaces (surface numbers 1-9) are shown in the column of the radius Ri of curvature (the meaning of symbol Ri is the same as in FIG. 1). In the column of the on-axis surface spacing Di, the value (mm) of an on-axis spacing between the ith surface Si and the (i+1)th surface Si+1 is shown in the space corresponding to the surface number i. In Examples 1 and 5, the-stop St is regarded as the first optical element (i=1). In Example 1, the on-axis surface spacing D1 of the stop St has a negative value, which means that the stop St is disposed on the image side of the lens surface that is closest to the object (i.e., the object-side surface of the first lens G1). The values of refractive indices of the first to fourth optical elements (j=1 to 4, numbered from the object side) for the d-line (wavelength: 587.6 nm) are shown in the column of the refractive index NDj. The values of Abbe numbers of the first to fourth optical elements (j=1 to 4, numbered from the object side) for the d-line are shown in the column of the Abbe number $\nu dj$. Other data, that is, the values of the paraxial focal length f (mm) and the F number (ENO.) of the entire system, are also shown in FIG. 8.

In the imaging lens of Example 1, both surfaces of each of the first lens G1, the second lens G2, and the third lens G3 are aspheric surfaces. In the lens data of FIG. 8, numerical values of the radii of curvature of portions close to the optical axis are shown as the radii Ri of curvature of these aspheric surfaces. In the numerical values of the aspheric surface data of FIG. 9, symbol E means that the numerical value following it is an exponent having a base "10" and that the power thus defined is to be multiplied by the numerical value before symbol E. For example, "1.0E-02" means $1.0 \times 10^{-2}$.

Each set of aspheric surface data is the values of coefficients $A_n$ and K of the following equation (A) representing an aspheric surface. More specifically, symbol Z represents the length (mm) of the perpendicular from a point (having a height h from the optical axis Z) on the aspheric surface to the tangential plane to the aspheric surface at its apex (i.e., the plane perpendicular to the optical axis Z1). Each aspheric surface of the imaging lens of Example 1 is represented as follows by effectively using the aspheric surface coefficients $A_n$, that is, the third to 20th coefficients $A_3$ to $A_{20}$:

$$Z = C \cdot h^2 / \{1 + (1 - K \cdot C^2 \cdot h^2)^{1/2}\} + \Sigma A_n \cdot h^n \quad (A)$$

(n: integer that is greater than or equal to 3)

where

Z: depth of the point on the aspheric surface (mm);

h: distance (height) from the optical axis Z1 to the point on the aspheric surface (mm);

K: eccentricity (second order aspheric surface coefficient);

C: paraxial curvature (=1/R where R is the paraxial radius of curvature); and $A_n$: nth order aspheric surface coefficient (n=3 to 20).

Specific lens data of Example 2 which corresponds to the imaging lens configuration of FIG. 2 are shown in FIGS. 10 and 11 in the same manners as in the imaging lens of Example 1. Likewise, specific lens data of Example 3 which corresponds to the imaging lens configuration of FIG. 3 are shown in FIGS. 12 and 13. Specific lens data of Example 4 which corresponds to the imaging lens configuration of FIG. 4 are shown in FIGS. 14 and 15. Specific lens data of Example 5 which corresponds to the imaging lens configuration of FIG. 5 are shown in FIGS. 16 and 17. Specific lens data of Example 6 which corresponds to the imaging lens configuration of FIG. 6 are shown in FIGS. 18 and 19. Specific lens data of Example 7 which corresponds to the imaging lens configuration of FIG. 7 are shown in FIGS. 20 and 21.

FIG. 22 summarizes, for each Example, the values of the parameters in the respective conditional expressions. As seen from FIG. 22, the parameter values of every Example fall within the numerical value ranges of the conditional expressions (1)-(5). The value of the refractive index $Nd_2$ of only the imaging lens of Example 6 falls within the numerical value range of the conditional expression (6).

FIGS. 23A-23C show the spherical aberration, astigmatism, and distortion of the imaging lens of Example 1, respectively. Each aberration diagram shows an aberration curve(s) for the d-line (reference wavelength). Aberration curves for the g-line (wavelength 435.8 nm) and the C-line (wavelength: 656.3 nm) are also shown in the spherical aberration diagram. In the astigmatism diagram, a solid-line curve represents aberration in the sagital direction and a broken-line curve represents aberration in the tangential direction. Symbol FNO. means the F number and $\omega$ represents the half angle of view.

Figure 24A:
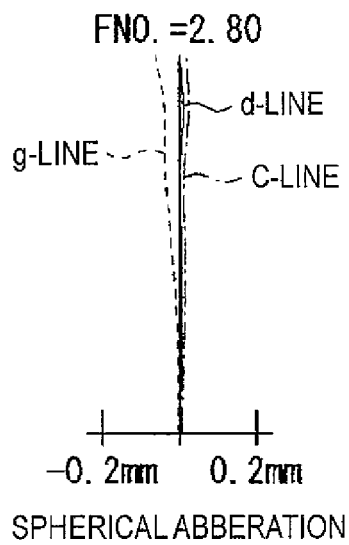
Figure 24B:
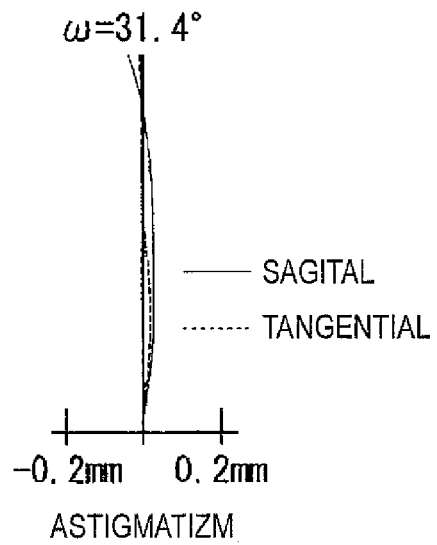
Figure 24C:
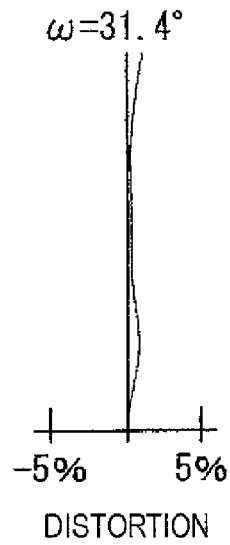
Figure 25A:
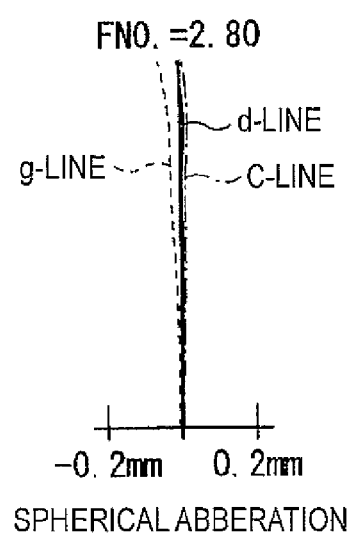
Figure 25B:
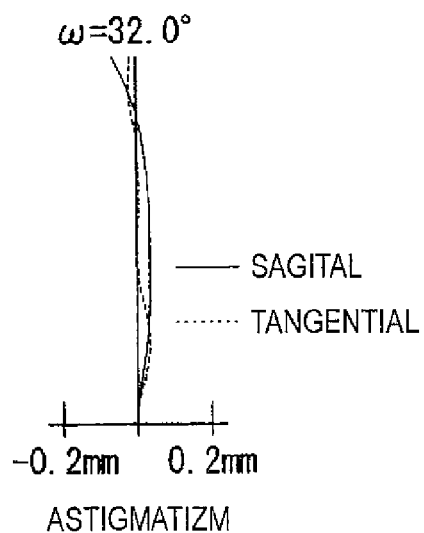
Figure 25C:
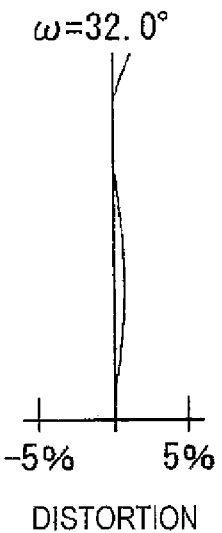
Figure 26A:
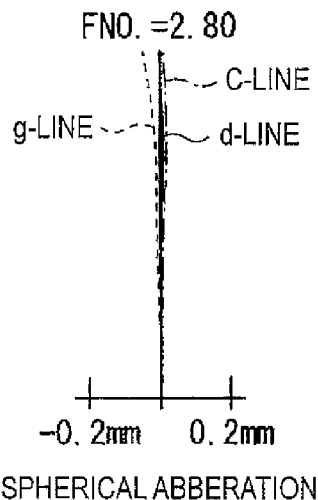
Figure 26B:
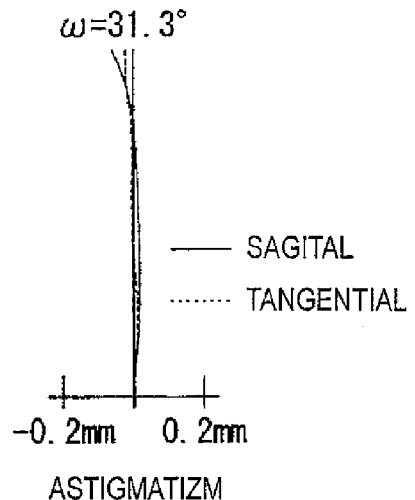
Figure 26C:
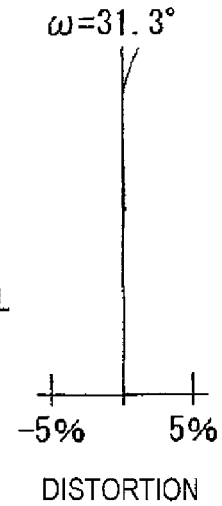
Figure 27A:
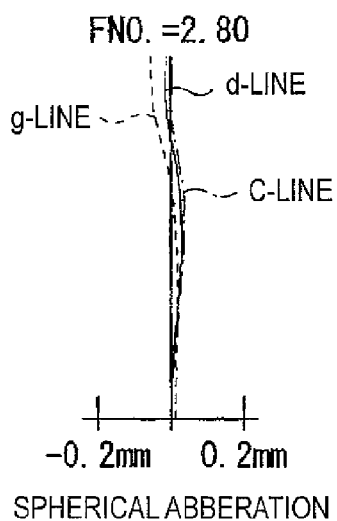
Figure 27B:
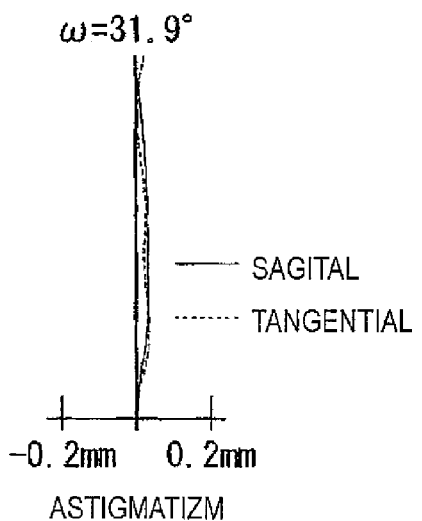
Figure 27C:
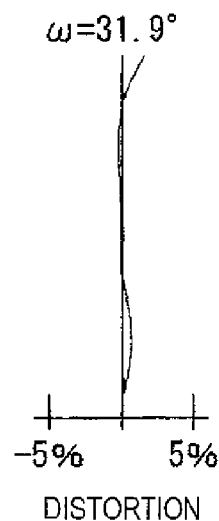
Figure 28A:
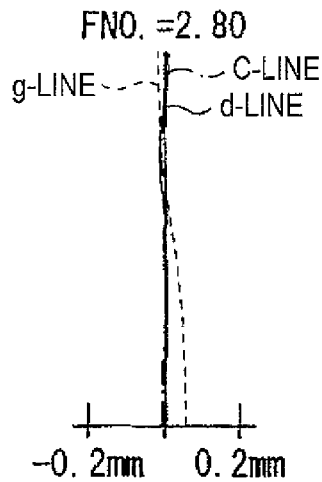
Figure 28B:
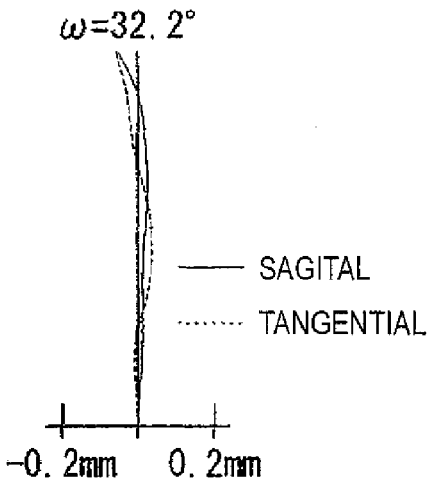
Figure 28C:
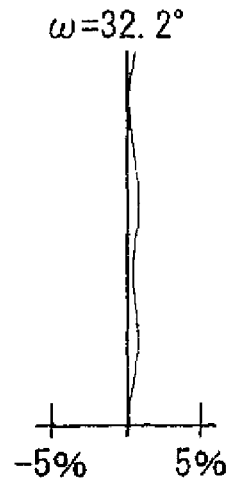
Figure 29A:
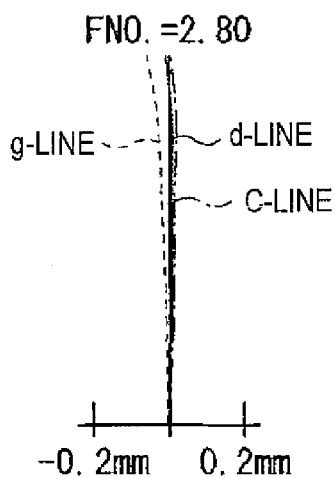
Figure 29B:
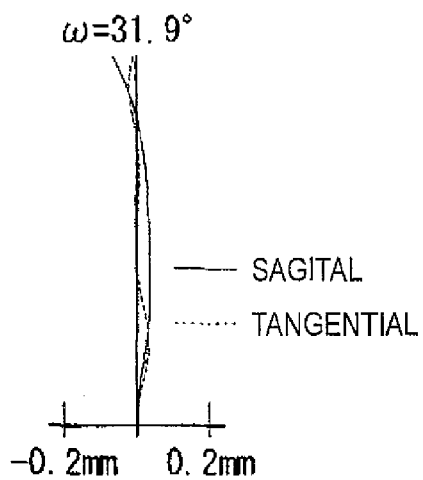
Figure 29C:
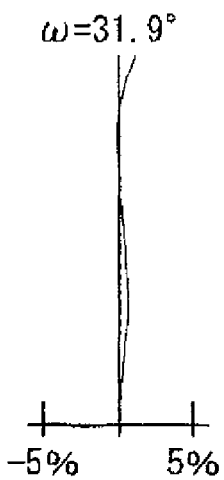

Likewise, FIGS. 24A-24C show the respective aberrations of the imaging lens of Example 2. FIGS. 25A-25C show the respective aberrations of the imaging lens of Example 3. FIGS. 26A-26C show the respective aberrations of the imaging lens of Example 4. FIGS. 27A-27C show the respective aberrations of the imaging lens of Example 5. FIGS. 28A-28C show the respective aberrations of the imaging lens of Example 6. FIGS. 29A-29C show the respective aberrations of the imaging lens of Example 7.

As seen from the above numerical value data and aberration diagrams, in each Example, the surface shape, material, and refractive power of each lens are optimized with a total of three lenses, whereby a compact, high-performance imaging lens system is realized.

The invention is not limited to the above embodiment or each of the above Examples and various modifications are possible. For example, the radii of curvature of the respective lens surfaces, the surface spacings, and the refractive indices of the respective lenses are not limited to the values shown in each numerical example and can take other values.

In the imaging lens according to the invention, the shape, refractive power, and lens material of each lens are optimized and the prescribed conditional expressions are satisfied with a small total number of (i.e., three) lenses. Therefore, a lens system can be realized which exhibits high image forming performance though it is compact.

Figure 30:
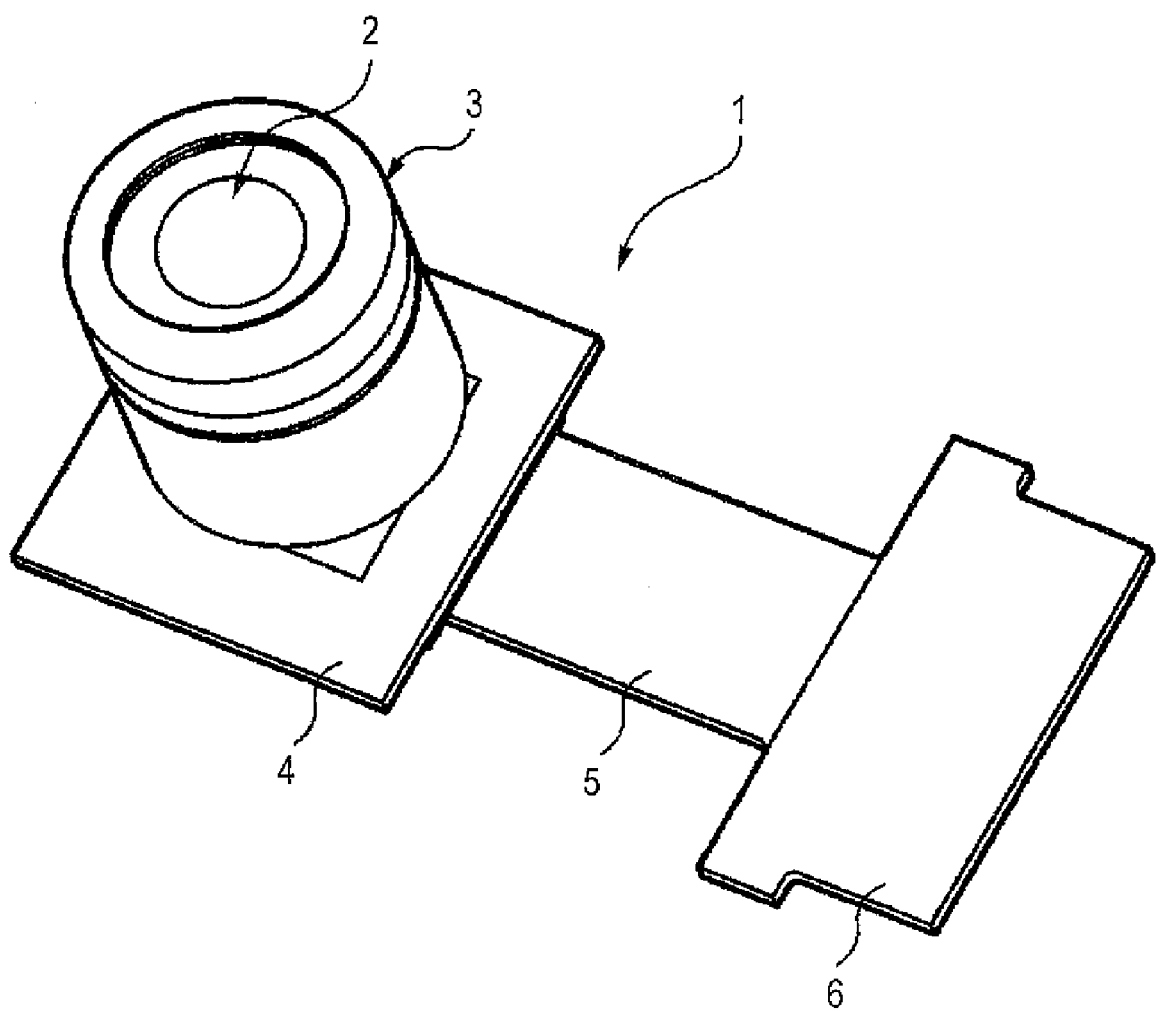
FIG. 30 is a perspective view showing an exemplary configuration of a camera module according to an embodiment of the invention.

FIG. 30 shows an exemplary configuration of a camera module incorporating the imaging lens according to the above embodiment.

The camera module 1 is equipped with a lens barrel 3 which houses the imaging lens 2 according to the above embodiment, a support substrate 4 which supports the lens barrel 3, and an imaging device which is provided on the support substrate 4 at a position corresponding to the image forming surface Simg of the imaging lens 2. The camera module 1 is also equipped with a flexible circuit board 5 which is electrically connected to the imaging device provided on the support substrate 4 and an external connection terminal 6 which is electrically connected to the flexible circuit board 5 and configured so as to be able to be connected to a portable-terminal-apparatus-main-body-side signal processing circuit of a cell phone with a camera or the like. These components are integral with each other.

The camera module 1 is incorporated in a portable terminal apparatus such as a cell phone or a PDA.

In the camera module 1, an optical image formed by the imaging lens 2 is converted by the imaging device into an electrical imaging signal, which is output to a portable-terminal-apparatus-main-body-side signal processing circuit via the flexible circuit board 5 and the external connection terminal 6. Employing the imaging lens 2 according to the above embodiment, the camera module 1 can produce an imaging signal with high imaging performance. The portable terminal apparatus main body side can generate a good image on the basis of the imaging signal. It is preferable that the imaging lens 2 according to the above embodiment be applied to an imaging device having two million to five million pixels because it exhibits high imaging performance.

Since the camera module according to this embodiment outputs an imaging signal which corresponds to an optical image formed by the imaging lens which is compact and exhibits high imaging performance, it can be miniaturized as a whole and produce a good imaging signal. In the portable terminal apparatus according to this embodiment, since it incorporates the camera module which is compact and exhibits high imaging performance, not only can the camera unit be miniaturized but also an imaging signal can be produced with high imaging performance and a good picked-up image can be obtained on the basis of the imaging signal.

The application field of the camera module according to this embodiment is not limited to portable terminal apparatus and may be incorporated in a digital still camera, for example.

The entire disclosure of each and every foreign patent application from which the benefit of foreign priority has been claimed in the present application is incorporated herein by reference, as if fully set forth.

What is claimed is:

1. An imaging lens comprising, in order from an object side:

a first lens having a positive refractive power and a meniscus shape and having a convex surface directed to the object side;

a second lens having a negative refractive power in the vicinity of an optical axis of the imaging lens; and a third lens having a positive refractive power in the vicinity of the optical axis, wherein at least one surface of each of the second lens and the third lens is an aspheric surface; and the imaging lens satisfies the following conditional expressions:

$$0.7 < |f1/f| < 0.8 \tag{1}$$

$$0.3 < |f2/f| < 0.8 \tag{2}$$

$$75 < {}_\nu d_1 < 96 \tag{3}$$

$$TL/2Y < 0.9 \tag{4}$$

where
  f: focal length of the imaging lens;
  f1: focal length of the first lens;
  f2: focal length of the second lens;
  ${}_\nu d_1$: Abbe number of the first lens for the d-line;
  TL: length between the object-side surface of the first lens to an image forming position of the imaging lens; and
  Y: maximum image height.

2. The imaging lens according to claim 1, further satisfying the following conditional expression:

$$0.5 < f3/f < 1.0 \qquad (5)$$

where f3 is a focal length of the third lens.

3. The imaging lens according to claim 2,
wherein an object-side surface of the second lens has an aspheric shape and a negative refractive power increasing from the vicinity of the optical axis toward a periphery, and
an image-side surface of the second lens has an aspheric shape and a positive refractive power decreasing from the vicinity of the optical axis toward a periphery.

4. The imaging lens according to claim 2, further satisfying the following conditional expression:

$$1.68 < Nd_2 \qquad (6)$$

where $Nd_2$ is a refractive index of the second lens for the d-line.

5. The imaging lens according to claim 1,
wherein an object-side surface of the second lens has an aspheric shape and a negative refractive power increasing from the vicinity of the optical axis toward a periphery, and
an image-side surface of the second lens has an aspheric shape and a positive refractive power decreasing from the vicinity of the optical axis toward a periphery.

6. The imaging lens according to claim 5, further satisfying the following conditional expression:

$$1.68 < Nd_2 \qquad (6)$$

where $Nd_2$ is a refractive index of the second lens for the d-line.

7. The imaging lens according to claim 1, further satisfying the following conditional expression:

$$1.68 < Nd_2 \qquad (6)$$

where $Nd_2$ is a refractive index of the second lens for the d-line.

8. A camera module comprising:
the imaging lens according to claim 1; and
an imaging device that outputs an imaging signal corresponding to an optical image formed by the imaging lens.

9. A portable terminal apparatus comprising the camera module according to claim 8.

* * * * *